United States Patent
Veltman

(10) Patent No.: US 6,257,820 B1
(45) Date of Patent: Jul. 10, 2001

(54) ATMOSPHERIC ROTARY FEED AND DISCHARGE TURRET VALVE AND METHOD

(75) Inventor: Joost Veltman, Aptos, CA (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/245,990

(22) Filed: Feb. 5, 1999

(51) Int. Cl.⁷ ....................................................... A23L 3/06
(52) U.S. Cl. ...................... 414/219; 422/297; 422/300; 426/521; 432/239; 53/91; 198/605; 198/608
(58) Field of Search ...................... 422/297, 300; 414/219, 149, 151, 152, 220; 99/361, 371; 426/521; 198/339.1, 478.1, 469.1, 473.1, 598, 605, 608, 715, 481.1; 53/91; 432/239

(56) References Cited

U.S. PATENT DOCUMENTS

| | | | |
|---|---|---|---|
| 1,327,540 | * | 1/1920 | Fooks ................................ 414/220 X |
| 1,385,594 | | 7/1921 | Thompson . |
| 1,398,476 | | 11/1921 | Thompson . |
| 1,432,953 | | 10/1922 | Berry . |
| 1,467,960 | | 9/1923 | Thompson . |
| 1,921,442 | * | 8/1933 | Thompson .............................. 414/219 |
| 3,707,823 | | 1/1973 | Guckel . |
| 5,538,383 | * | 7/1996 | Ikeda et al. ............................ 414/219 |
| 5,685,216 | | 11/1997 | Veltman et al. . |
| 5,705,218 | | 1/1998 | Veltman . |

OTHER PUBLICATIONS

"Rotary Pressure Sterilizer," Copyright 1993 by FMC Corporation.
Rotary Pressure Sterilizer brochure of FMC Corporation.

* cited by examiner

*Primary Examiner*—Frank E. Werner
(74) *Attorney, Agent, or Firm*—Flehr Hohbach Test Albritton & Herbert LLP

(57) ABSTRACT

A transfer valve assembly (10) for use as a feed valve or a discharge valve includes a series of open-faced pockets (46) biased by leaf springs (48) off of a central hub (44) and an arcuate saddle piece (22) mounted at an opening (14) of a sterilizer vessel (12) for transferring containers from an infeed conveyor (34) onto an interior reel (18). The engagement of open-faced pockets (46) with saddle (22) creates a seal to prevent the escape of steam, but gaps are provided between pockets (46) which allow for a controlled escape of steam in a manner that allows the pressure within the sterilizer vessel to be maintained at a slightly elevated level.

41 Claims, 6 Drawing Sheets

ATMOSPHERIC ROTARY FEED AND DISCHARGE TURRET VALVE AND METHOD

TECHNICAL FIELD

The present invention relates to rotary sterilizer vessels and transfer valves therefor and, more particularly, to an atmospheric rotary feed and discharge valve for delivering and receiving containers into and out of an atmospheric rotary sterilizer.

BACKGROUND ART

Atmospheric rotary sterilizers are used to sterilize containers of food products that are high in acid content, while pressure sterilizers are used for food products low in acid, which require more heating to achieve thorough sterilization of the food. Atmospheric sterilization is advantageous over pressure sterilization from an equipment standpoint because atmospheric pressure levels greatly simplify equipment design and operation. With pressure sterilizers, pressure levels as high 45 psi and more are used to sterilize food containers, which requires that transfer valves be sealed to maintain the high pressure levels within the sterilization vessels. Sealed transfer valves require greater power inputs to operate, which complicates associated drive systems. In fact, pressurized transfer valves can utilize up to 80% of the power requirements of a rotary sterilizer system. The high power inputs to transfer valves require complex gearing and precise valve positioning in order to rotate the transfer valves, which complicates design of the drive system machinery and significantly adds to its cost. Complex gearing also limits a sterilizers ability to handle different size containers due to the specific timing requirements of different sized containers.

A disadvantage of atmospheric rotary sterilizers is the upper temperature limits of these machines. Typically, an atmospheric rotary sterilizer is limited to process temperatures of 206 to 210 degrees Fahrenheit, depending on elevation. Pressure sterilizers, of course, can achieve significantly higher temperatures and, thus require shorter processing times.

A rotary sterilizer, either pressure of atmospheric, operates generally as follows. Filled containers enter a processing line by means of a positive feed device, which synchronizes the cans with the rest of the line. From the feed device, the containers are transferred to a rotary valve on the sterilizer vessel, which, in the case of a pressure sterilizer, is designed to prevent the escape of steam from the vessel shell. Inside the vessel shell, containers are positively conveyed by a spiral and reel mechanism. The reel rotates and pushes the containers along the spiral. The containers are then ejected from the reel to a rotary discharge valve and into the next sterilizing vessel or cooling vessel, as the case may be.

Within the sterilizer vessel, containers are heated by steam from a trough on the bottom of the vessel. Uniform distribution of steam is ensured by a manifold steam supply system feeding the trough along the entire length of the vessel. Bleeders are placed at frequent intervals along the top of the vessel and in the transfer valves of pressure sterilizers. Such continuous air removal ensures uniform temperature control, as required by safety regulations.

The rotor in each transfer valve is constructed with equally spaced sprockets on the valve's periphery. Each pocket is designed to hold one can and is mechanically timed with the station on the reel. At the discharge end, a star wheel mounted within the reel gently ejects the containers into the discharge valve for removal from the vessel.

Atmospheric rotary sterilizers typically feed containers directly onto the sterilizer's reel within its vessel. The containers are fed by a free roller feed or a feed chute through an inlet opening in the vessel shell. Due to low steam pressures within the vessel and also due to the size of the opening relative to the size of the cans, a minimal amount of steam and air escapes through the inlet opening.

The present invention is designed to provide a low pressure sterilizer and transfer valve mechanism that achieves advantages of the both atmospheric and pressure sterilizers.

DISCLOSURE OF INVENTION

Briefly described, the transfer valve of the present invention is positioned adjacent an inlet or discharge opening in a sterilizer vessel, and includes a plurality of radially outwardly facing pockets for receiving the containers and transferring them to the inlet opening or away from the discharge opening, into and out of the vessel. The pockets are circumferentially spaced apart to provide gaps between the pockets, and the transfer valve further includes an arcuate transfer valve saddle extending from opposite sides of the inlet opening around a portion of the circumference of the rotary transfer valve. The saddle is positioned so that the pockets are substantially sealed against the saddle prior to and during movement over the inlet or discharge opening. In operation, most of the air and steam escaping the atmospheric rotary vessel at the inlet or discharge opening escapes through the inlet opening between the pockets and the saddle.

According to an aspect of the invention, each pocket may be biased radially outwardly against the saddle by a spring mechanism. The biasing of the pockets allows for wear of the contact surfaces between the pockets and the saddle while maintaining a seal between the pockets and the saddle. Preferably, the rotary transfer valve includes side plates, one on each lateral side of the pockets, for supporting the pockets as they are biased against the saddle.

According to another aspect of the invention, gaps are provided between the pockets and the saddle, and the size of the gaps between the pockets allows for sufficient air and steam to escape in order to maintain a suitable low steam-to-air ratio within the vessel. Preferably the saddle extends only around a portion of the circumference of the transfer valve, so that a portion of the pockets are exposed to the exterior of the vessel as they rotate around the transfer valve. In addition, the interior of the transfer valve is open to the gaps between the pockets, so that air and steam escaping through the inlet opening enters the interior of the transfer valve and can subsequently escape the transfer valve to the exterior of the vessel through the gaps between the pockets moving around the exposed portion of the transfer valve.

According to another aspect of the invention, the size of the gaps between the pockets is narrow enough to maintain a raised pressure within the rotary vessel. The raised pressure within the rotary vessel is at least 2 psi above atmospheric pressure. Preferably, the raised pressure within the rotary vessel is at least 3 psi.

The present invention also includes an atmospheric rotary steam vessel assembly that includes a rotary atmospheric steam vessel for heating containers, the steam vessel including an inlet opening for receiving containers to be heated and an outlet opening to eject heated containers, and a rotary feed transfer valve adjacent the inlet opening, with a plurality of radially outwardly facing pockets for receiving the containers and transferring them to the inlet opening and into the vessel. The pockets are circumferentially spaced apart to provide gaps between the pockets. The steam vessel assembly further includes an arcuate transfer saddle extending from opposite sides of the inlet opening around a portion of the circumference of the rotary transfer valve and is positioned so that the pockets are substantially sealed against the saddle prior to and after moving over the inlet opening. In operation, most of the air and steam escaping the atmospheric rotary vessel at the inlet opening escapes through between the pockets and the saddle.

According to an aspect of the invention, the assembly further comprises a timing device for delivering containers to the transfer valve in a manner that places one container into each pocket. The assembly also may include a rotary discharge transfer valve adjacent the outlet opening. The discharge transfer valve includes a plurality of radially outwardly facing pockets for receiving the containers from the vessel, the pockets being circumferentially spaced apart to provide gaps between the pockets, and an arcuate transfer saddle extending from opposite sides of the outlet opening around a portion of the circumference of the discharge transfer valve and which is positioned so that the pockets are substantially sealed against the saddle prior to and after moving over the outlet opening.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
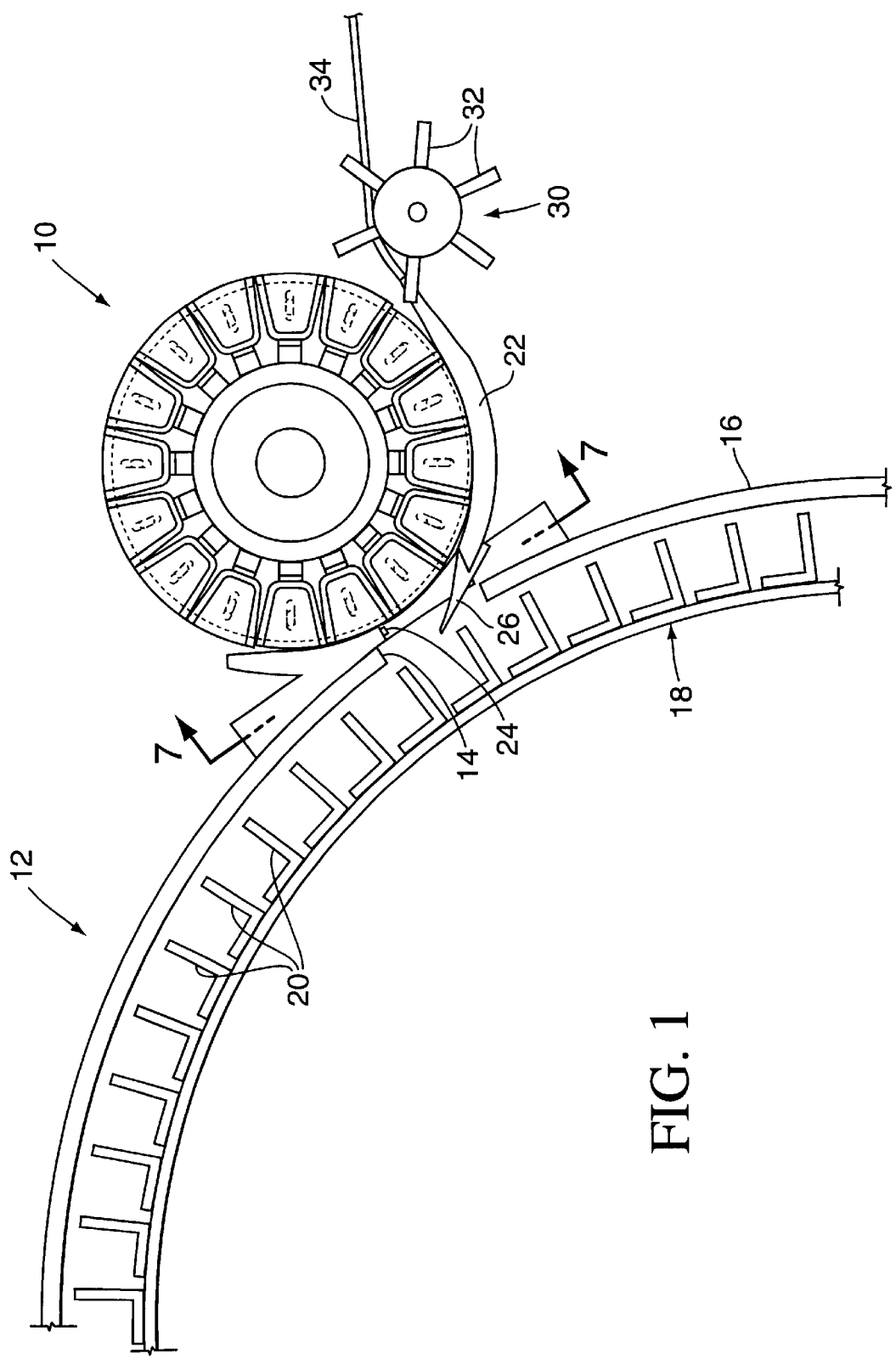
FIG. 1 is a schematic side cut-away view of a transfer feed valve of the present invention in combination with a timing wheel and part of a sterilizer reel.

Referring to FIG. 1, the transfer valve 10 of the present invention is shown as a turret-like feed valve for delivering containers into a continuous rotary sterilizer vessel 12 through an opening 14 in the shell 16 of the vessel. Sterilizer vessel 12 includes a rotatable reel 18 that includes a plurality of angle bars 20 that receive and carry the containers in a spiral path through the vessel and to a discharge opening. While in vessel 12, the containers are subjected to steam heating for a sufficient duration to sterilize the contents within the container. My prior U.S. Pat. No. 5,705,218 discloses a rotary pressure sterilizer that is similar in design to vessel 12.

Transfer valve 10 seats against an arcuate saddle piece 22 that is secured to shell 16 around opening 14 therein. Saddle piece 22 includes an opening 24 that aligns with opening 14 is shell 16 to present a common inlet passageway into vessel 12. An angled paddle 26 is provided at aligned openings 14, 24 for guiding the containers from transfer valve 10 down onto an angle bar 20. On the opposite side of transfer valve 10 from vessel 12 is a timing wheel 30 that includes a plurality of radial paddles 32 that, due to their spacing, ensure uniform delivery of containers from an infeed conveyor 34 onto saddle 22.

Figure 2:
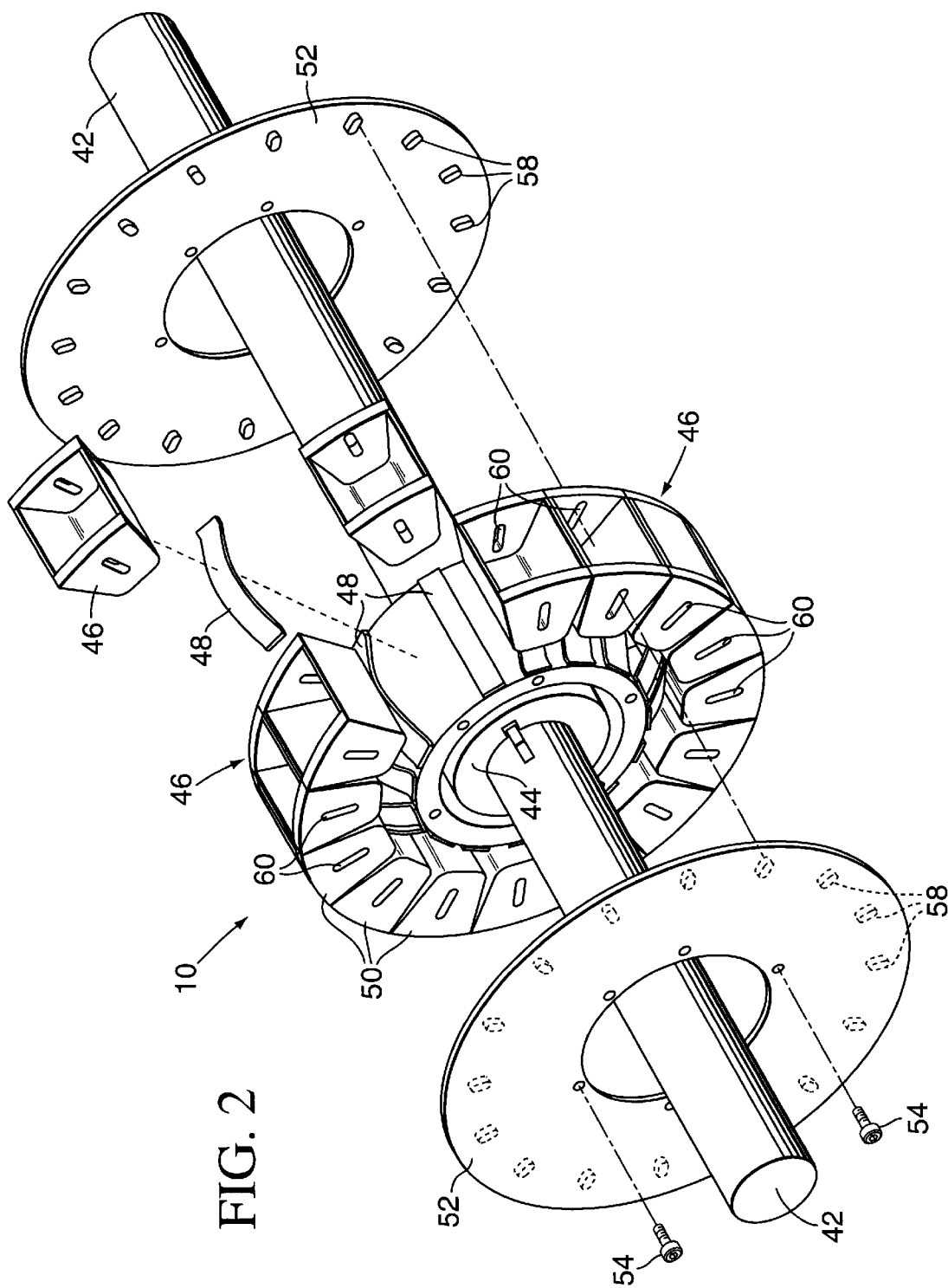
FIG. 2 is an exploded view of the transfer valve of FIG. 1.

Referring to FIG. 2, transfer valve 10 is mounted for rotation on a drive shaft 42 and for this includes a central hub 44 keyed onto shaft 42. A series of outwardly open-faced pockets 46 are provided around central hub 44 and are each spaced therefrom by a curved leaf spring 48. The sides 50 of pockets 46 are essentially co-planer in order for a pair of circular retaining plates 52 to mount flush with the pockets and thereby contain the pockets within the transfer valve. Retaining plates 52 are secured to central hub 44 by a series of screws 54. Each retaining plate 52 includes a series of inwardly projecting lugs 58, one for each pocket 46, and the side walls 50 of each pocket 46 includes a key slot 60 for receiving a lug, as discussed in more detail later.

Figure 3:
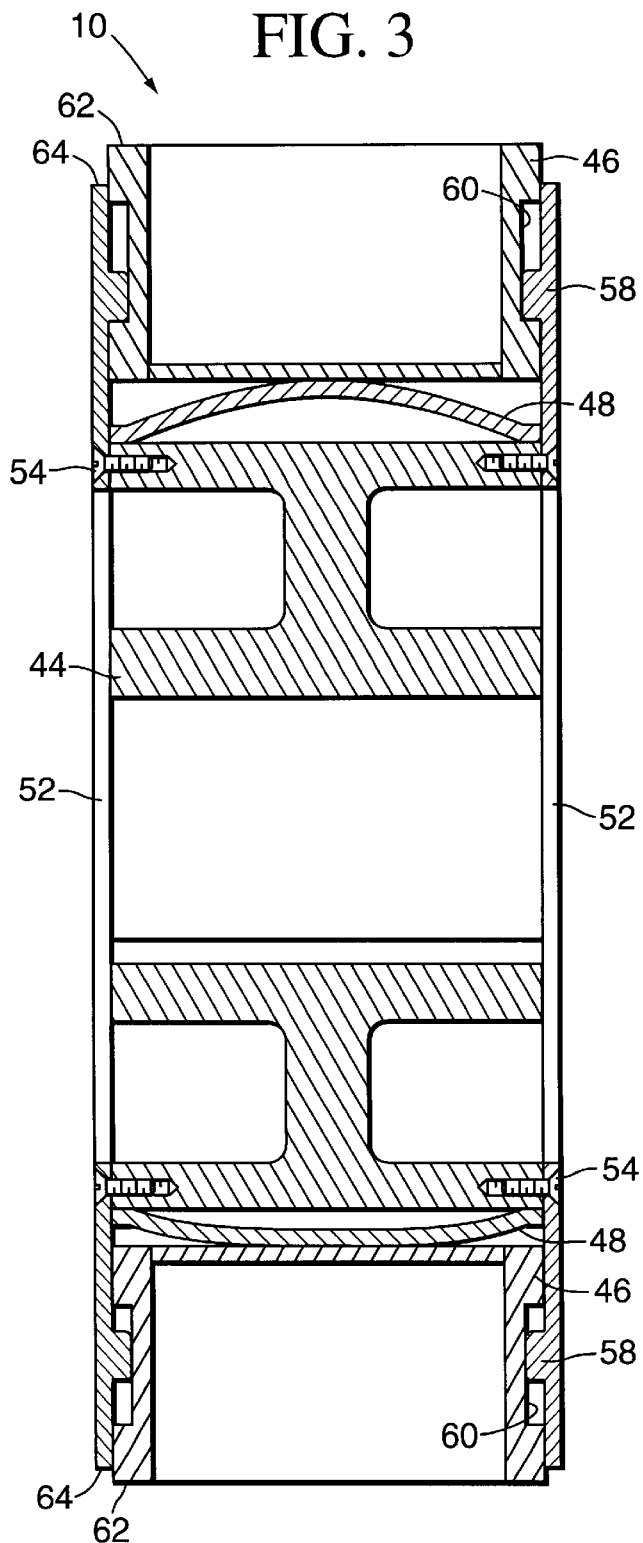
FIG. 3 is an enlarged end sectional view of the transfer valve of FIG. 1.

Referring to FIG. 3, transfer valve 10 is shown in section. Retaining plates 52 are rigidly secured to central hub 44, by means of screws 54, and define therebetween an annular space for pockets 46. The interengagement of lugs 58 and key slots 60 radially movably secures pockets 46 between retaining plates 52 and in position above leaf springs 48. Leaf springs 48, in turn, are captured against central hub 44 by means of pockets 46. Leaf springs 48 are shaped and sized to bias pockets 46 radially outwardly so that lugs 58 engage the inner end of key slots 60 and the radial outer edge 62 of pockets 46 extends slightly beyond the outer edge 64 of retaining plates 52. Leaf springs 48 do allow for slight radial inward movement of pockets 46 as the pockets engage the saddle, which operation is discussed later with reference to FIG. 6.

Figure 4:
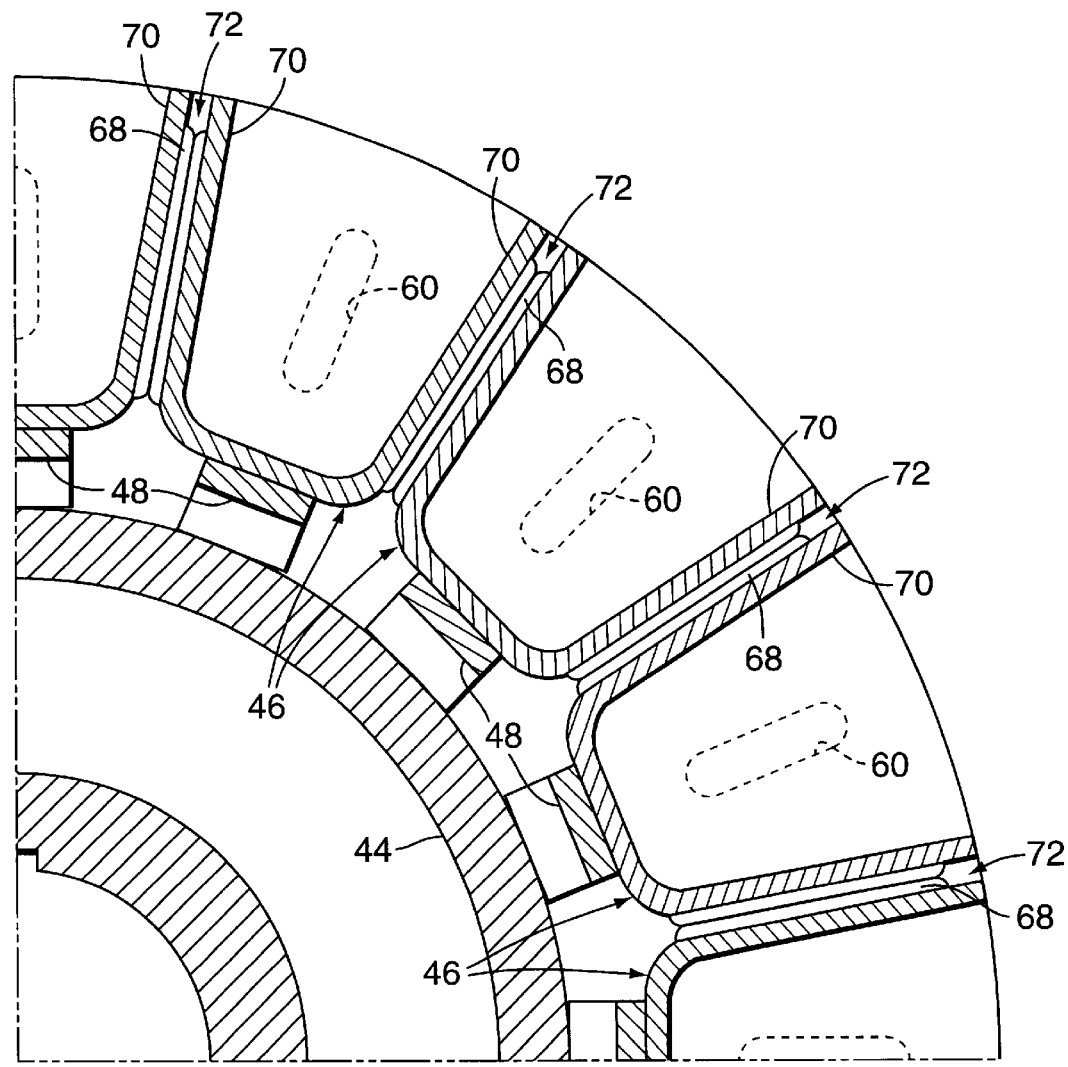
FIG. 4 is an enlarged side sectional view of a portion of the transfer valve of FIG. 1.

Referring to FIG. 4, each pocket 46 includes a radially aligned raised rim 68 extending up each adjacent side wall 70 of pockets 46. Each rim 68 engages the rim immediately adjacent it in order to space apart adjacent side walls 70 to form a gap 72 between the pockets. As discussed later, gaps 72 provide a passageway for the escape of steam out of the transfer valve. Other configurations can be employed to space apart adjacent pockets in lieu of rims 68.

Figure 5:
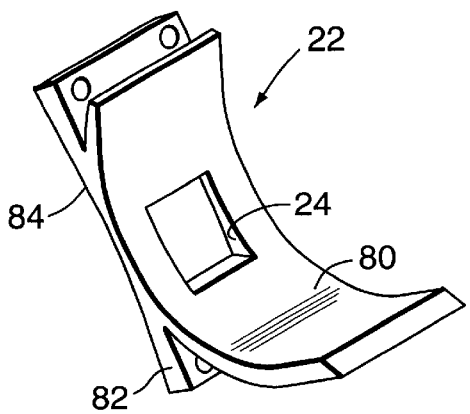
FIG. 5 is a pictorial view of the saddle for the transfer valve of FIG. 1.

Referring to FIG. 5, saddle 22 includes an arcuate saddle portion 80 that has a radius of curvature equal to the radius of the transfer valve. Saddle portion 80 is formed integrally with a base plate 82 that has a curved underside 84 that conforms to the shape of the sterilizer vessel. Base plate 82 is secured to the shell of the sterilizer vessel about the container opening therein. Opening 24 in saddle 22 aligns with the shell container opening to present a common inlet passageway for containers into the vessel. The width of saddle portion 80 is at least as wide as the transfer valve and preferably a little wider to provide sufficient engagement between the saddle and the outward edges of each pocket. Opening 24 is slightly wider than the containers to be sterilized and preferably is the same width as the length of each pocket.

Figure 6:
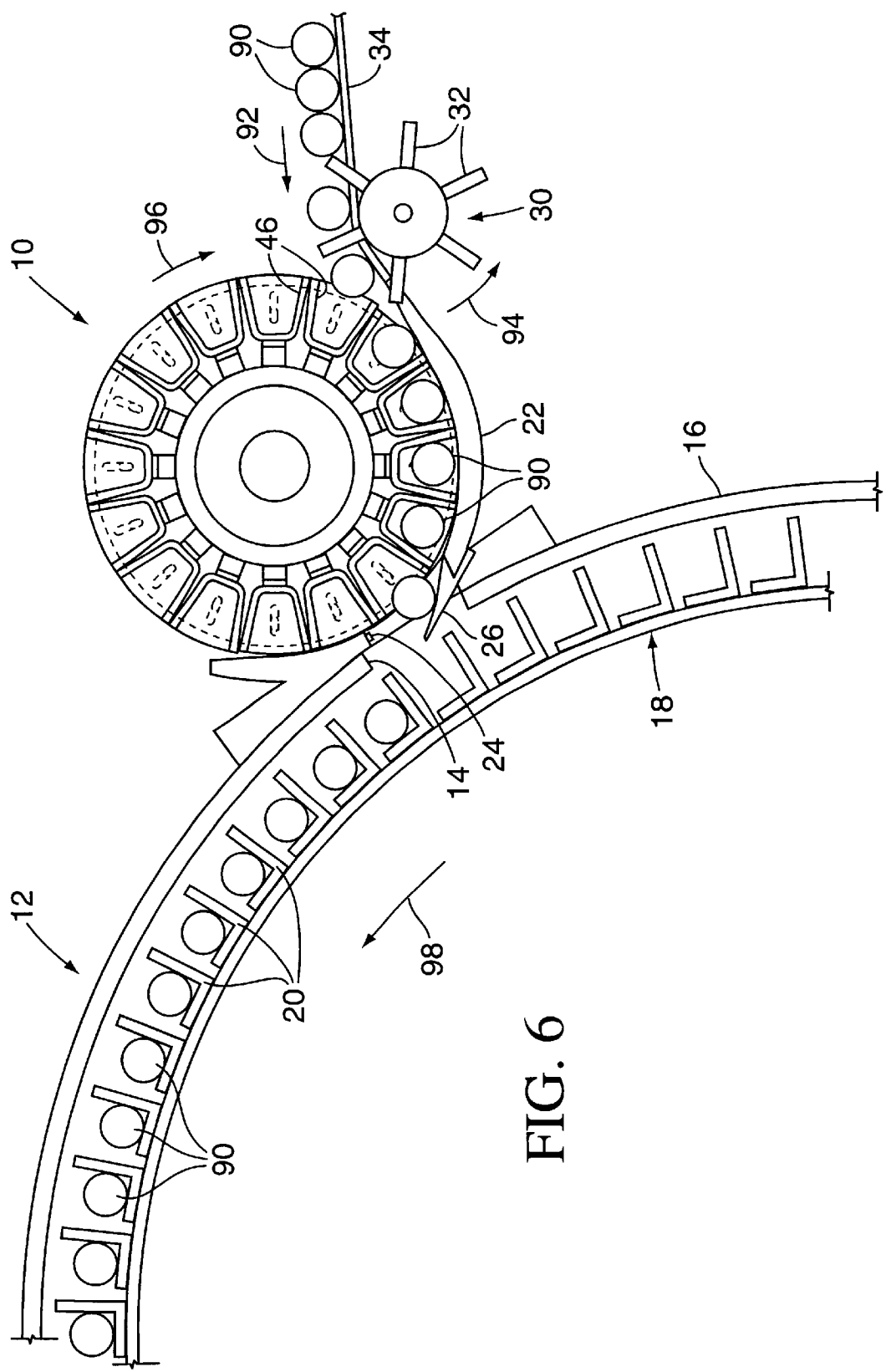
FIG. 6 is a schematic side cut-away view like FIG. 1 showing the transfer valve, timing wheel and sterilizer wheel in operation.

FIG. 6 shows operation of transfer valve 10 operating as a feed valve. Containers 90 are fed by conveyor 34 in the direction of arrow 92 onto saddle 22. Timing wheel 30 rotates in the direction of arrow 94, which causes paddles 32 to move between oncoming containers 90 to separate and coordinate the entry of each container into a pocket 46. Transfer valve 10 rotates in the direction of arrow 96 and as it does, pockets 46 each capture a container 90 against saddle 22 and move the container along the saddle to opening 24. As the containers move along saddle 22, the outer edges of pockets 46 slide against the saddle to form a significant yet not necessarily totally air tight seal around each pocket.

As the pockets move over opening 24, containers 90 roll onto paddle 26 and then through openings 24, 14 and onto an angle bar 20 of reel 18. Reel 18 rotates in the direction of arrow 98 and moves the containers around the sterilizer vessel in a spiral path that eventually leads to a discharge opening at the other end of the vessel where a discharge valve receives the containers and transfers them to an outfeed conveyor or into another sterilizer vessel.

Figure 7:
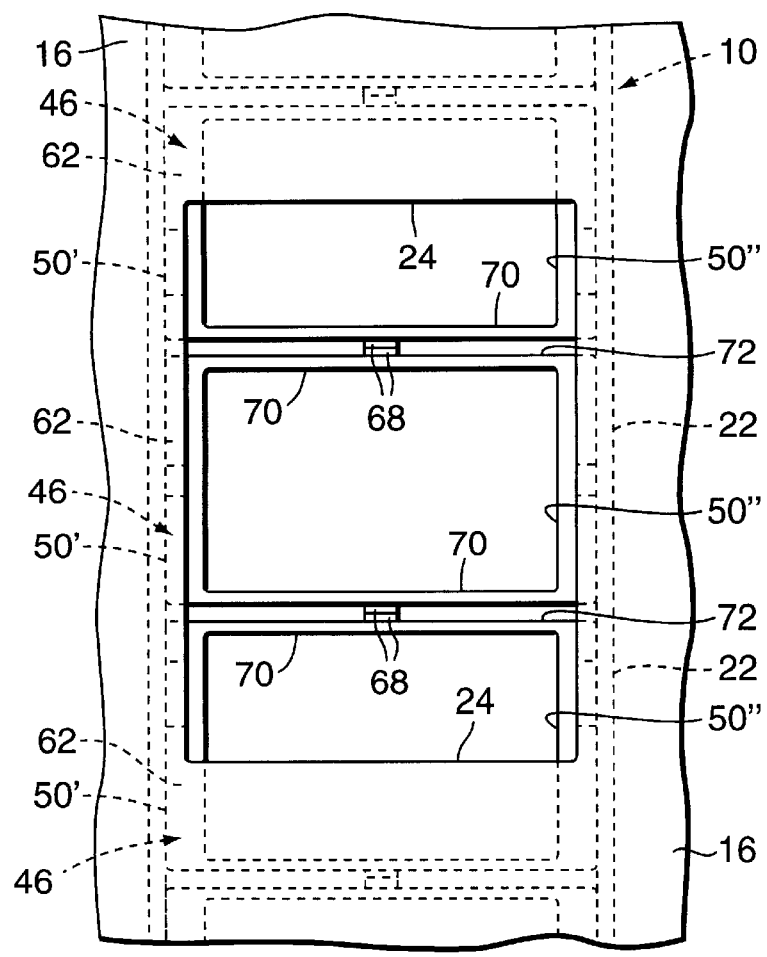
FIG. 7 is a schematic view showing pockets moving over either an inlet or outlet opening of a transfer valve.

FIG. 7 is a view of inlet openings 24 as seen from inside the sterilizer vessel 16. The pockets 46 of transfer valve 10 are slightly wider than opening 24 so that as the pockets move over the opening the outer edges 50' of their side walls 50 are positioned laterally beyond opening 24 and their inner edges 50" are positioned laterally inwardly of opening 24. In this manner, the radial outer surface 62 of side walls 50 straddles the side edge of opening 24 and thereby creates a seal to prevent steam from escaping between the saddle 22 and the pockets 46. The leaf springs (not shown) behind each pocket 46 can be designed to provide additional bias of pockets 46 against saddle 22.

As pockets 46 move over opening 24, gaps 72 between the pockets allow for the escape of steam into the interior of the transfer valve and from there to atmosphere. Raised rims 68 between each pocket 46 ensures formation of gaps 72, which are narrow enough to provide resistance to escaping steam in order to maintain a slightly elevated pressure within the sterilizer vessel.

The arcuate shape of saddle 22 allows the saddle to extend from opposite sides of inlet opening 24 around a portion of the circumference of the rotary transfer valve. In this manner, the saddle is positioned so that the pockets are substantially sealed against the saddle prior to and during movement over the inlet opening. As a result, most of the air and steam escaping the atmospheric rotary sterilizer vessel at the inlet opening escapes through the gaps between the pockets and not between the seals of the pockets and the saddle.

Within the sterilizer vessel, steam condenses on the containers and eventually drips down into a catch basin. As the steam condenses, heat is transferred into the container. Steam circulation through the vessel ensures that the air/steam ratio within the vessel remains within an acceptable range set by food safety regulations. Typically, the air-to-steam ratio is less than 1%, which ensures that the air content has little or no effect on the heat transfer process.

The spring biased pockets of the present invention work well for atmospheric vessels. For pressure sterilizers that operate at greatly elevated pressure levels, a relatively large spring mechanism would be required to counteract and bias the pockets against the saddle. Accordingly, to maintain a pressure seal at the inlet and outlet of pressurized vessels, transfer valves are sealed in order to minimize pressure loss at the inlet and outlet openings. Such transfer valves include cast housings and rotary turrets, precision formed and gasket sealed, with additional seal strips between individual pockets, to maintain a pressure seal around the valve. The present invention achieves an elevated pressure level within the vessel, yet avoids the costly requirement of sealed transfer valves.

In addition, pressurized transfer valves, due to the greater force necessary to rotate them, require more complex drive gears. Typically, a pinion gear is driven off of the main bull gear that powers the reel of the sterilizer. The pinion gear and associated drive shaft, in turn, drive transfer valve gearing, which includes a saddle gear that has to be precisely located with respect to the reel in order for the transfer valves to be properly timed with the sterilizer reel. Driving all these gears, of course, necessitates accurate pitch between the gears, which necessitates extra machining to achieve close tolerances and precise machine dimensions.

Figure 8:
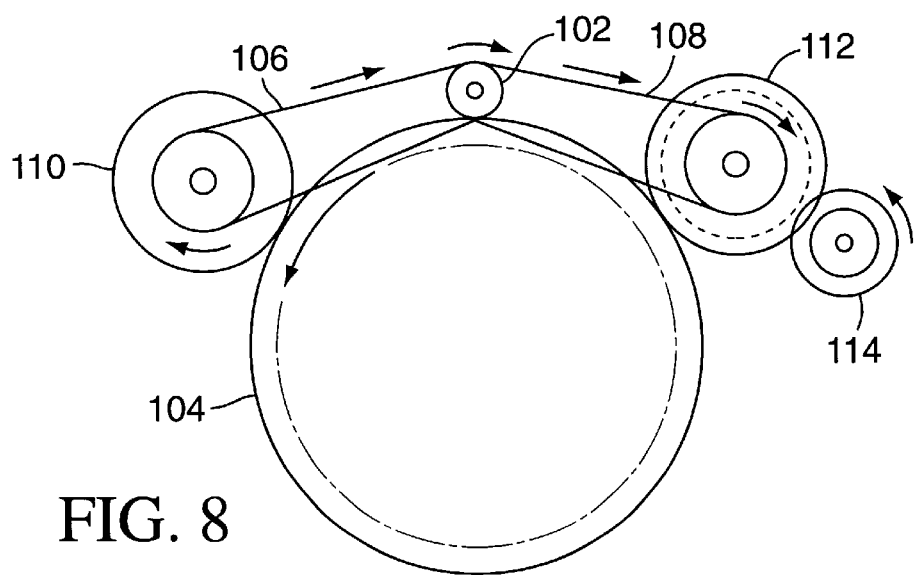
FIG. 8 is a schematic side view of the drive system for the system of FIG. 1.

The present invention simplifies the gearing of the transfer valves, as shown in FIG. 8. A pinion 102 is driven off of the main system drive and it in turn drives a reel gear 104 for rotating the sterilizer reel. A pair of timing belts 106, 108 are utilized to drive sprockets 110, 112, respectively, which in turn drive the discharge and feed transfer valves. Additionally, a drive gear 114 is driven off of the feed valve gear 112.

A drive system with timing belts has several advantages over a gear drive system. Sterilizer reels have different reel steps to accommodate different size containers. A reel step is the number of containers per rotation in the vessel. The speed of the transfer valves needs to be adjusted for different reel steps. With a timing belt, the speed of the transfer valve turret is easily adjusted, with little or no modification to the turret, to accommodate different container sizes. A simple take-up pulley can take any slack out of the timing belts. With a gear drive, specific gear mesh and spacing is required for each reel spacing, which necessitates complex machining and assembly of the gear system for each reel size. By replacing the transfer valve drive gears associated with pressure vessels with the timing belts of the present invention, precisely machined gear tolerances and accurate gear positioning is not required and drive system complexity in reduced while flexibility is enhanced.

An additional benefit of eliminating drive gears is a significant reduction in power consumption. It is not uncommon for up to 80% of power to be consumed by the transfer valves. With timing belts, the percentage of power used by the transfer valves can be reduced by a significant quantity, and will be only a fraction of the total power requirement.

In operation, it is desirable for each pocket to have a small amount of radial travel as it engages the saddle to assure a proper seal over time as the saddle and pockets wear and to allow for manufacturing tolerances. A one-eighth inch compression of each pocket should provide an acceptable range of movement to accommodate anticipated wear and manufacturing tolerances between the two sliding components.

The purpose of the saddle is to seal the pocket face by isolating the pockets from each other and sealing the pocket face. The slight gap between adjacent pockets allows a small amount of steam to vent through the openings for the transfer valves. Additional bleeder valves can be provided in the vessel shell if required.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

The invention claimed is:

1. A transfer valve assembly for use with an atmospheric steam sterilizer vessel having a rotary reel and an inlet opening for receiving containers from the transfer valve assembly, comprising:
    a rotary transfer valve adjacent the inlet opening, with a plurality of radially outwardly facing pockets exposed to atmosphere for receiving the containers and transferring them to the inlet opening and into the sterilizer vessel as both the rotary transfer valve and the reel of the atmospheric steam sterilizer vessel are rotated, and
    an arcuate transfer valve saddle extending from opposite sides of the inlet opening around a portion of the circumference of the rotary transfer valve and being positioned so that the pockets engage the saddle during rotary movement over the inlet opening in a manner allowing steam within the atmospheric steam sterilizer vessel to escape the inlet opening yet creating a seal sufficient to raise the pressure within the steam sterilizer vessel at least one psi, the pockets adapted to receive containers prior to engagement of the pockets with the saddle.

2. The transfer valve assembly of claim 1 wherein, each pocket is biased radially outwardly against the saddle by a spring mechanism.

3. The transfer valve assembly of claim 2 wherein, the biasing of the pockets allows for wear of the contact surfaces between the pockets and the saddle while maintaining a seal between the pockets and the saddle.

4. The transfer valve assembly of claim 3 wherein, the rotary transfer valve includes side plates, one on each lateral side of the pockets, for supporting the pockets as they are biased against the saddle.

5. The transfer valve assembly of claim 1 wherein, gaps are provided between the pockets and the saddle, and the size of the gaps allows for sufficient air and steam to escape in order to maintain a suitable steam-to-air ratio within the vessel.

6. The transfer valve assembly of claim 5 wherein, the saddle extends only around a portion of the circumference of the transfer valve, so that a portion of the pockets are exposed to the exterior of the vessel as they rotate around the transfer valve.

7. The transfer valve assembly of claim 6 wherein, the gaps are provided between the pockets, and the interior of the transfer valve is open to the gaps between the pockets, so that air and steam escaping through the inlet opening enters the interior of the transfer valve and can subsequently escape the transfer valve to the exterior of the vessel through the gaps between the pockets moving around the exposed portion of the transfer valve.

8. The transfer valve assembly of claim 1 wherein, the gaps between the pockets are narrow enough to maintain a raised pressure within the steam sterilizer vessel.

9. The transfer valve assembly of claim 8 wherein, the raised pressure within the steam sterilizer vessel is at least 2 psi.

10. The transfer valve assembly of claim 8 wherein, the raised pressure within the steam sterilizer vessel is at least 3 psi.

11. A steam sterilizer vessel assembly, comprising
    an atmospheric steam sterilizer vessel for heating containers, the steam vessel including an inlet opening and a rotary reel for receiving containers to be heated and an outlet opening to eject heated containers,
    a rotary feed transfer valve adjacent the inlet opening, with a plurality of radially outwardly facing pockets for receiving the containers and transferring them to the inlet opening and into the vessel as both the rotary transfer valve and the rotary reel of the steam sterilizer vessel are rotated, and
    an arcuate transfer saddle extending from opposite sides of the inlet opening around a portion of the circumference of the rotary transfer valve and being positioned so that the pockets engage the saddle during rotary movement over the inlet opening in a manner allowing steam within the rotary steam vessel to escape the inlet opening yet creating a seal sufficient to raise the pressure within the steam sterilizer vessel at lease 1 psi over atmospheric pressure, the pockets adapted to receive containers prior to engagement of the pockets with the saddle.

12. The assembly of claim 11 and further comprising a timing device for delivering containers to the transfer valve in a manner that places one container into each pocket.

13. The assembly of claim 12 and further comprising,
    a rotary discharge transfer valve adjacent the outlet opening, the discharge transfer valve including a plurality of radially outwardly facing pockets for receiving the containers from the vessel, and
    an arcuate transfer saddle extending from opposite sides of the outlet opening around a portion of the circumference of the discharge transfer valve and being positioned so that the pockets engage the saddle during movement over the inlet opening in a manner allowing steam to escape the inlet opening yet creating a seal sufficient to raise the pressure within the steam vessel at least one psi.

14. The assembly of claim 13 wherein, each discharge transfer valve pocket is biased radially outwardly by a spring mechanism.

15. The assembly of claim 14 wherein, the biasing of the discharge transfer valve pockets allows for wear of the contact surfaces between the pockets and the saddle while maintaining a seal between the pockets and the saddle.

16. The assembly of claim 13 wherein, the discharge transfer valve includes circular side plates, one on each lateral side of the pockets, for creating a seal at their peripheral edges with the saddle.

17. The assembly of claim 16 wherein, the gaps between the discharge transfer valve pockets allow for sufficient air and steam to escape in order to maintain a suitable steam-to-air ratio within the vessel.

18. The assembly of claim 17 wherein, the saddle extends only around a portion of the circumference of the discharge transfer valve, so that a portion of the discharge transfer valve pockets are exposed to the exterior of the vessel as they rotate around the discharge transfer valve.

19. The assembly of claim 18 wherein, the interior of the discharge transfer valve is open to the gaps between the pockets, so that air and steam escaping through the gaps between the pockets moving over the outlet opening enters the interior of the discharge transfer valve and can subsequently escape the discharge transfer valve to the exterior of the vessel through the gaps between the pockets moving around the exposed portion of the discharge transfer valve.

20. The assembly of claim 13 wherein, the size of the gaps between the discharge transfer valve pockets is narrow enough to maintain a raised pressure within the steam sterilizer vessel.

21. The assembly of claim 20 wherein, the raised pressure within the steam sterilizer vessel is at least 2 psi.

22. The assembly of claim 20 wherein, the raised pressure within the steam sterilizer vessel is at least 3 psi.

23. The assembly of claim 11 wherein, each feed transfer valve pocket is biased radially outwardly by a spring mechanism.

24. The assembly of claim 23 wherein, the biasing of the feed transfer valve pockets allows for wear of the contact surfaces between the pockets and the saddle while maintaining a seal between the pockets and the saddle.

25. The assembly of claim 11 wherein, the feed transfer valve includes circular side plates, one on each lateral side of the pockets, for creating a seal at their peripheral edges with the saddle.

26. The assembly of claim 25 wherein, gaps are provided between the pockets and the saddle and the size of the gaps allows for sufficient air and steam to escape in order to maintain a suitable steam-to-air ratio within the vessel.

27. The assembly of claim 26 wherein, the saddle extends only around a portion of the circumference of the transfer valve, so that a portion of the pockets are exposed to the exterior of the vessel as they rotate around the transfer valve.

28. The assembly of claim 27 wherein, the interior of the transfer valve is open to the gaps between the pockets, so that air and steam escaping through the gaps between the pockets moving over the inlet opening enters the interior of the transfer valve and can subsequently escape the transfer valve to the exterior of the vessel through the gaps between the pockets moving around the exposed portion of the transfer valve.

29. The assembly of claim 11 wherein, the gaps between the pockets are narrow enough to maintain a raised pressure within the steam sterilizer vessel.

30. The assembly of claim 29 wherein, the raised pressure within the steam sterilizer vessel is at least 2 psi.

31. The assembly of claim 30 wherein, the raised pressure within the steam sterilizer is at least 2 psi.

32. A transfer valve assembly for use with a steam sterilizer vessel having an outlet opening and rotary reel for discharging containers from the vessel, comprising:

a rotary discharge transfer valve adjacent the inlet opening, with a plurality of radially outwardly facing pockets for receiving the containers from the vessel as both the rotary transfer valve and the reel of steam sterilizer vessel are rotated, the pockets being circumferentially spaced apart to provide gaps between the pockets, and an arcuate transfer saddle extending from opposite sides of the outlet opening around a portion of the circumference of the discharge transfer valve and being positioned so that the pockets are substantially sealed against the saddle prior to and after moving over the outlet opening, the pockets being adapted to receive the containers prior to engagement of the pockets with the saddle, whereby most of the air and steam escaping the steam sterilizer vessel at the outlet opening escapes through the gaps between the pockets and not between the seals of the pockets and the saddle.

33. The transfer valve assembly of claim 32 wherein, each pocket is biased radially outwardly by a spring mechanism.

34. The transfer valve assembly of claim 33 wherein, the biasing of the pockets allows for wear of the contact surfaces between the pockets and the saddle while maintaining a seal between the pockets and the saddle.

35. The transfer valve assembly of claim 32 wherein, the discharge transfer valve includes circular side plates, one on each lateral side of the pockets, for creating a seal at their peripheral edges with the saddle.

36. The transfer valve assembly of claim 35 wherein, the size of the gaps between the pockets allows for sufficient air and steam to escape in order to maintain a suitable steam-to-air ratio within the vessel.

37. The transfer valve assembly of claim 36 wherein, the saddle extends only around a portion of the circumference of the discharge transfer valve, so that a portion of the pockets are exposed to the exterior of the vessel as they rotate around the transfer valve.

38. The transfer valve assembly of claim 37 wherein, the interior of the transfer valve is open to the gaps between the pockets, so that air and steam escaping through the gaps between the pockets moving over the outlet opening enters the interior of the transfer valve and can subsequently escape the discharge transfer valve to the exterior of the vessel through the gaps between the pockets moving around the exposed portion of the transfer valve.

39. The transfer valve assembly of claim 32 wherein, the size of the gaps between the pockets is narrow enough to maintain a raised pressure within the steam sterilizer vessel.

40. The transfer valve assembly of claim 39 wherein, the raised pressure within the steam sterilizer vessel is at least 2 psi.

41. The transfer valve assembly of claim 39 wherein, the raised pressure within the steam sterilizer vessel is at least 3 psi.

* * * * *